United States Patent
Molina Llorente et al.

(10) Patent No.: US 12,143,007 B2
(45) Date of Patent: Nov. 12, 2024

(54) METHOD AND SYSTEM FOR BALANCING PARALLEL DC/DC CONVERTERS

(71) Applicant: LEAR CORPORATION, Southfield, MI (US)

(72) Inventors: Ruben Molina Llorente, Valls (ES); Antonio Martinez Perez, Valls (ES); Pablo Gaona Rosanes, Valls (ES); Rafael Jimenez Pino, Valls (ES)

(73) Assignee: Lear Corporation, Southfield, MI (US)

( * ) Notice: Subject to any disclaimer, the term of this patent is extended or adjusted under 35 U.S.C. 154(b) by 234 days.

(21) Appl. No.: 17/533,314

(22) Filed: Nov. 23, 2021

(65) Prior Publication Data
US 2023/0163683 A1 May 25, 2023

(51) Int. Cl.
*H02M 3/04* (2006.01)

(52) U.S. Cl.
CPC ..................... *H02M 3/04* (2013.01)

(58) Field of Classification Search
CPC .................................................. H02M 3/04
See application file for complete search history.

(56) References Cited

U.S. PATENT DOCUMENTS

| | | | |
|---|---|---|---|
| 5,521,809 A | 5/1996 | Ashley et al. | |
| 5,724,237 A | 3/1998 | Hunter | |
| 6,009,000 A | 12/1999 | Siri | |
| RE38,454 E | 3/2004 | Walters et al. | |
| 8,730,695 B1 | 5/2014 | Ludlam et al. | |
| 2004/0041548 A1 | 3/2004 | Perry | |
| 2007/0296387 A1 | 12/2007 | Dong et al. | |
| 2009/0051335 A1 | 2/2009 | Huang | |
| 2010/0277140 A1* | 11/2010 | Liu | H02J 1/10 290/1 R |
| 2016/0072388 A1 | 3/2016 | Dubus et al. | |
| 2016/0274651 A1 | 9/2016 | Laur | |
| 2018/0123454 A1* | 5/2018 | Symonds | H02J 1/10 |
| 2019/0168632 A1 | 6/2019 | Deng et al. | |
| 2022/0224236 A1* | 7/2022 | Elshaer | H01F 27/40 |

FOREIGN PATENT DOCUMENTS

WO 0156130 A2 8/2001

OTHER PUBLICATIONS

First Office Action for German Application No. 10 2022 122 973.4, dated Sep. 24, 2024, 37 Pages.

* cited by examiner

*Primary Examiner* — Jue Zhang
(74) *Attorney, Agent, or Firm* — Brooks Kushman P.C.

(57) ABSTRACT

A method and system for balancing output currents of parallel connected first and second DC/DC converters is provided. In operation, the first converter (i) receives, via a communications line connected between the converters such as a CAN bus, a value of the output current of the second converter and (ii) uses this value in weighing an output voltage comparison performed by the first converter for generating the output current of the first converter to thereby adjust the output current of the first converter based on this value. Likewise, the second converter (i) receives, via the communications line, a value of the output current of the first converter and (ii) uses this value in weighing an output voltage comparison performed by the second converter for generating the output current of the second converter to thereby adjust the output current of the second converter based on this value.

20 Claims, 4 Drawing Sheets

METHOD AND SYSTEM FOR BALANCING PARALLEL DC/DC CONVERTERS

TECHNICAL FIELD

The present invention relates to a DC/DC converter assembly having multiple DC/DC converters connected in parallel.

BACKGROUND

A DC/DC converter converts an input DC (direct current) voltage into an output DC voltage. More particularly, a buck DC/DC converter converts an input DC voltage with an input DC current into a lower output DC voltage with a higher output DC current. Conversely, a boost DC/DC converter converts an input DC voltage with an input DC current into a higher output DC voltage with a lower output DC current.

A vehicle may have a high-voltage (HV) network, for example a 400 V DC network, and a low-voltage (LV) network, for example a 12 V DC network. A DC/DC converter may be used between the HV and LV networks to connect these two voltage networks together. Consequently, the DC/DC converter may convert a high input DC voltage (e.g., 400 V) of the HV network into a low output DC voltage (e.g., 12 V) for use by loads connected to the LV network. Conversely, assuming the DC/DC converter is bidirectional, the DC/DC converter may convert a low input DC voltage of the LV network into a high output DC voltage for use by loads connected to the HV network.

Multiple DC/DC converters may be connected in parallel between the HV network and the LV network such as to provide redundancy, to meet increased current commands of loads, and the like. For example, using two of the same DC/DC converters connected in parallel, the output current is effectively doubled.

In certain cases, it is desirable that multiple DC/DC converters connected in parallel provide equal output currents (i.e., share the load equally). As an example of equal output currents, in the case of there being four DC/DC converters, each DC/DC converter is to provide 25% of the total output current. In other cases, it is desirable that multiple DC/DC converters connected in parallel provide different predetermined output currents. As an example of different predetermined output currents, in the case of there being two DC/DC converters, one of the DC/DC converters may be to provide, for instance, 40% (or 45%, 48%, etc.) of the total output current and the other one of the DC/DC converters may be to provide 60% (or 55%, 52%, etc.) of the total output current.

However, even apparently identical DC/DC converters will have different output voltages due to instability due to component tolerances due to measurement or to generation. In operation, if one of the DC/DC converters determines that its output voltage is over a target output voltage then this DC/DC converter may decide to reduce its output current, while another one of the DC/DC converters may decide the reverse and act otherwise. This may cause a diverging control and instability. Also, if one of the DC/DC converters generates an output current greater than what another one of the DC/DC converters "expects" (due to tolerances), then this other DC/DC converter may decide to reduce its output current, leading to the first DC/DC converter increasing its output current. Consequently, without requisite adjustment, the output currents of the DC/DC converters will be different than what is desired.

SUMMARY

An object includes a method and system for balancing output currents of parallel connected DC/DC converters in which each DC/DC converter (i) receives, via a communications line connected between the DC/DC converters such as a CAN bus, the value of the output current of the other DC/DC converter and (ii) uses this value in weighing an output voltage comparison performed by the DC/DC converter for generating the output current of the DC/DC converter to thereby adjust the output current of the DC/DC converter based on this value.

In carrying out at least one of the above and/or other objects, a DC/DC converter assembly is provided. The DC/DC converter assembly includes a plurality of DC/DC converters connected in parallel. Each DC/DC converter has a controller. The controllers of the DC/DC converters are in communication with one another via a communications line such as a Controller Area Network (CAN) bus. The controller of each DC/DC converter is configured to transmit to the controller of each other DC/DC converter via the communications line a value of an output current of the DC/DC converter. The controller of each DC/DC converter is configured to control the DC/DC converter to cause the output current of the DC/DC converter to tend toward a desired proportion of the output current of the DC/DC converter to a total output current of all of the DC/DC converters.

The desired proportion of the output current of the DC/DC converter to the total output current may be such that each DC/DC converter is to provide equal output currents. The desired proportion of the output current of the DC/DC converter to the total output current may be such that one of the DC/DC converters is to provide a greatest output current and another one of the DC/DC converters is to provide a littlest output current.

Further, in carrying out at least one of the above and/or other objects, another DC/DC converter assembly is provided. The DC/DC converter assembly includes first and second DC/DC converters connected in parallel. The first DC/DC converter has a first controller. The second DC/DC converter has a second controller. The first and second controllers are in communication with one another via a communications line such as a CAN bus. The first controller is configured to transmit to the second controller via the communications line a value of an output current of the first DC/DC converter and the second controller is configured to transmit to the first controller via the communications line a value of the output current of the second DC/DC converter. The first controller is configured to control the first DC/DC converter to cause the value of the output current of the first DC/DC converter to tend toward the value of the output current of the second DC/DC converter and the second controller is configured to control the second DC/DC converter to cause the value of the output current of the second DC/DC converter to tend toward the value of the output current of the first DC/DC converter.

The first controller may control the first DC/DC converter as a function of a ratio of the value of the output current of the first DC/DC converter to a value of a total output current of the DC/DC converter assembly in causing the value of the output current of the first DC/DC converter to tend toward the value of the output current of the second DC/DC converter. The total output current of the DC/DC converter assembly is a summation of the output current of the first DC/DC converter and the output current of the second DC/DC converter.

The second controller may control the second DC/DC converter as a function of a ratio of the value of the output current of the second DC/DC converter to the value of the total output current of the DC/DC converter assembly in causing the value of the output current of the second DC/DC converter to tend toward the value of the output current of the first DC/DC converter.

The first controller may control the first DC/DC converter based on a difference between an output voltage of the first DC/DC converter and a target voltage of the DC/DC converter assembly and based on a difference between the output current of the first DC/DC converter and a target output current of the first DC/DC converter for the first DC/DC converter to generate the output current of the first DC/DC converter.

In this case, the first controller may weigh the difference between the output voltage of the first DC/DC converter and the target voltage of the DC/DC converter assembly as a function of a ratio of the value of the output current of the first DC/DC converter to a value of a total output current of the DC/DC converter assembly. Further in this case, the first controller may adjust the target output current of the first DC/DC converter based on the weighted difference between the output voltage of the first DC/DC converter and the target voltage of the DC/DC converter assembly.

The second controller may control the second DC/DC converter based on a difference between an output voltage of the second DC/DC converter and the target voltage of the DC/DC converter assembly and based on a difference between the output current of the second DC/DC converter and a target output current of the second DC/DC converter for the second DC/DC converter to generate the output current of the second DC/DC converter.

In this case, the second controller may weigh the difference between the output voltage of the second DC/DC converter and the target voltage of the DC/DC converter assembly as a function of a ratio of the value of the output current of the second DC/DC converter to a value of a total output current of the DC/DC converter assembly. Further in this case, the second controller may adjust the target output current of the second DC/DC converter based on the weighted difference between the output voltage of the second DC/DC converter and the target voltage of the DC/DC converter assembly.

The first DC/DC converter and the second DC/DC converter may be for converting an input voltage with an input current of a traction battery of an electric vehicle into an output voltage with a total output current for charging an auxiliary battery of the electric vehicle. The total output current is a summation of the output current of the first DC/DC converter and the output current of the second DC/DC converter.

Also, in carrying out at least one of the above and/or other objects, a method for balancing output currents of parallel connected first and second DC/DC converters of a DC/DC converter assembly is provided. The method includes transmitting from a first controller of the first DC/DC converter to a second controller of the second DC/DC converter, via a communications line, such as a CAN bus, connected between the first controller and the second controller, a value of an output current of the first DC/DC converter. The method further includes transmitting from the second controller to the first controller, via the communications line, a value of the output current of the second DC/DC converter.

The method further includes controlling, by the first controller, the first DC/DC converter to cause the value of the output current of the first DC/DC converter to tend toward the value of the output current of the second DC/DC converter. The method further includes controlling, by the second controller, the second DC/DC converter to cause the value of the output current of the second DC/DC converter to tend toward the value of the output current of the first DC/DC converter.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is recognized that various electrical devices such as controllers as disclosed herein may include various microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, these electrical devices utilize one or more microprocessors to execute a computer-program that is embodied in a non-transitory computer readable medium that is programmed to perform any number of the functions as disclosed. Further, the various electrical devices as provided herein include a housing and various numbers of microprocessors, integrated circuits, and memory devices ((e.g., FLASH, random access memory (RAM), read only memory (ROM), electrically programmable read only memory (EPROM), electrically erasable programmable read only memory (EEPROM)) positioned within the housing. The electrical devices also include hardware-based inputs and outputs for receiving and transmitting data, respectively from and to other hardware-based devices as discussed herein.

Figure 1:
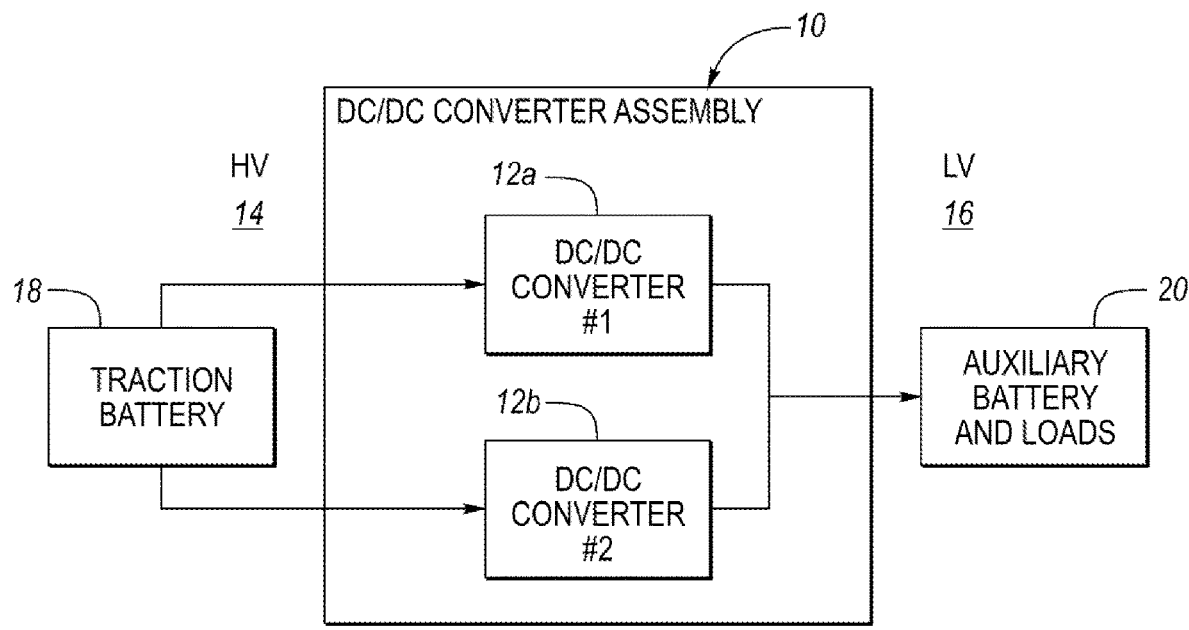
FIG. 1 illustrates a block diagram of a DC/DC converter assembly having parallel-connected first and second DC/DC converters in accordance with embodiments of the present invention, the DC/DC converters being connected in parallel between a high-voltage (HV) network and a low-voltage (LV) network.

Referring now to FIG. 1, a block diagram of a DC/DC converter assembly 10 in accordance with embodiments of the present invention is shown. DC/DC converter assembly 10 has a first DC/DC converter 12a and a second DC/DC converter 12b. First and second DC/DC converters 12a and 12b are connected in parallel between a high-voltage (HV) network 14 and a low-voltage (LV) network 16 (i.e., the converters are connected in parallel between voltage networks having different voltages from one another).

HV network 14 and LV network 16 are set forth as examples of voltage networks in which the voltage of one of the voltage networks (i.e., HV network 14) is greater than the voltage of the other one of the voltage networks (i.e., LV network 16). As such, HV network 14 may be considered to be a "high-voltage" network in the sense that it has a greater voltage than LV network 16; and LV network 16 may be considered to be a "low-voltage" network in the sense that is has a smaller voltage than HV network 14. In other embodiments, HV network 14 may be considered to be a "high-voltage" network in the sense that its voltage falls within a range defined to be a "high-voltage" range (e.g., 200 to 800 V DC); and LV network 16 may be considered to be a "low-voltage" network in the sense that its voltage falls within a range defined to be a "low-voltage" range (e.g., 5 to 24 V DC). Correspondingly, one of voltage networks 14 and 16 may be a "medium-voltage" network having a voltage falling within a range defined to be a "medium-voltage" range (e.g., 36 to 72 V DC). As such, when the medium-voltage network has a greater voltage than the other voltage network, the medium-voltage network may be considered as being a "high-voltage" network simply due to the fact that it has a greater voltage than the other voltage network; and when the medium-voltage network has a smaller voltage than the other voltage network, the medium-voltage network may be considered as being a "low-voltage" network simply do to the fact that it has a smaller voltage than the other voltage network.

DC/DC converter assembly 10 may be "on-board" an electric vehicle (EV) with HV network 14 and LV network 16 being voltage networks of the EV. The terms "electric vehicle" and "EV" herein encompass any type of vehicle which uses electrical power for vehicle propulsion including battery-only electric vehicles (BEV), hybrid electric vehicles (HEV), plug-in hybrid electric vehicles (PHEV), and the like.

A traction battery 18 of the EV is connected to HV network 14. Traction battery 18 is a high-voltage DC battery that stores electrical energy for powering electric machines of the EV to propel the EV. For instance, traction battery 18 is a 400 V DC battery.

An auxiliary battery 20 of the EV is connected to LV network 16. Auxiliary battery 20 is a low-voltage DC battery that stores electrical energy for powering one or more low-voltage vehicle loads. For instance, auxiliary battery 20 is a 12 V DC battery.

In addition to providing electric energy for vehicle propulsion, traction battery 18 provides electrical energy for charging auxiliary battery 20. In this regard, DC converter assembly 10 is connected between traction battery 18 and auxiliary battery 20 as shown in FIG. 1. DC/DC converter assembly 10 converts a high-voltage DC output of traction battery 18 into a low-voltage DC output compatible with auxiliary battery 20. More particularly, DC/DC converters 12a and 12b in conjunction with one another convert the HV DC output of traction battery 18 to the LV DC output compatible with auxiliary battery 20.

Figure 2A:
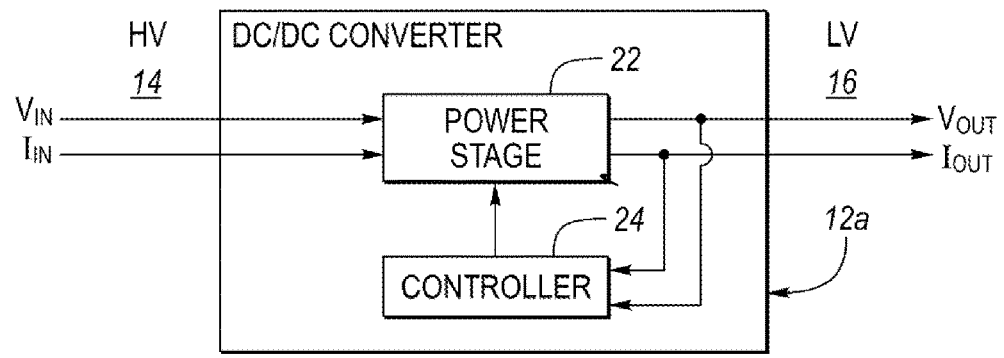
FIG. 2A illustrates a block diagram of the first DC/DC converter of the DC/DC converter assembly.
Figure 2B:
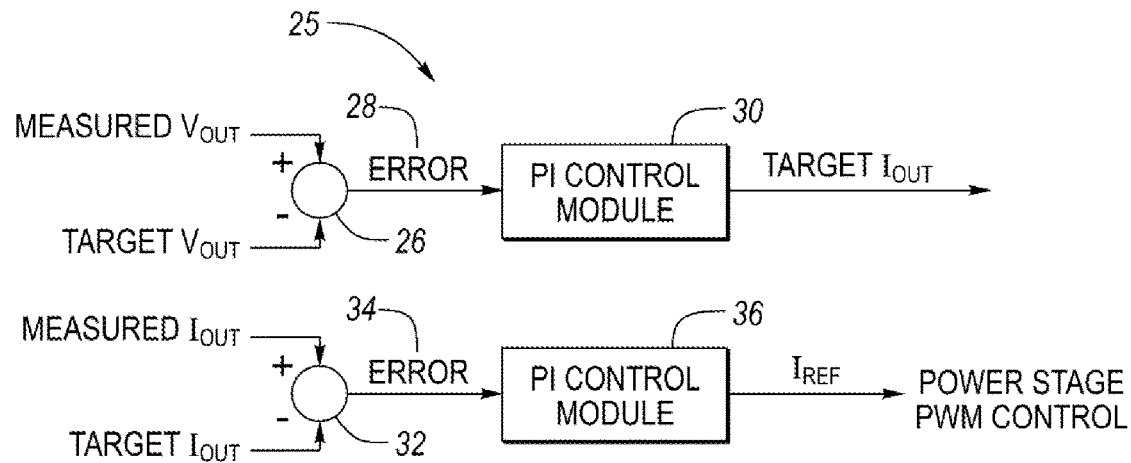
FIG. 2B illustrates a flow diagram depicting general operation of the first DC/DC converter.

Referring now to FIGS. 2A and 2B, a block diagram of first DC/DC converter 12a of DC/DC converter assembly 10 and a flow diagram 25 depicting general operation of the first DC/DC converter is shown. FIGS. 2A and 2B depict general configuration and operation of a DC/DC converter. In this case, the depicted DC/DC converter is first DC/DC converter 12a. First and second DC/DC converters 12a and 12b may be identical DC/DC converters having different component values due to tolerances. As such, the depictions in FIGS. 2A and 2B are also representative of second DC/DC converter 12b. Further, first and second DC/DC converters 12a and 12b may be different types of DC/DC converters having different power input/output capabilities. Nevertheless, the depiction in FIGS. 2A and 2B of one of the types of DC/DC converters would also be representative of the other type of DC/DC converter.

As shown in FIG. 2A, DC/DC converter 12a includes a power stage 22 and a controller 24. As known to those of ordinary skill in the art, as an example of a DC/DC converter layout, power stage 22 includes (not shown) an inverter module, a rectifier module, and a transformer module, the transformer module being connected between the inverter module and the rectifier module. The inverter module is connected to HV network 14 and the rectifier module is connected to LV network 16. The inverter module includes a high-voltage bridge of power switches. The rectifier module includes a low-voltage bridge of power switches or diodes. The transformer module includes a transformer having a primary side connected to the high-voltage bridge of the inverter module and a secondary side connected to the low-voltage bridge of the rectifier module.

Controller 24 of DC/DC converter 12a is configured to control the operation of power stage 22 for DC/DC converter 12a to convert an input DC voltage ($V_{IN}$) with an input DC current ($I_{IN}$) into a lower output DC voltage ($V_{OUT}$) with a higher output DC current ($I_{OUT}$). Particularly, controller 24 controls the power switches of the inverter module, and the power switches of the rectifier module if applicable, to turn on and off at a selected interval rate (i.e., selectively activates/deactivates the power switches) for DC/DC converter 12a to convert the input DC voltage with the input DC current into a target output DC voltage with a target output DC current. For instance, controller 24 controls the power switches by providing appropriate pulse-width modulated (PWM) control signals to the power switches.

In order to appropriately control the power switches of DC/DC converter 12a, such as by providing appropriate PWM control signals, controller 24 employs digital processing of measured output voltages and measured output currents of power stage 22. In this regard, controller 24 receives feedback signals indicative of the measured output voltages and measured output currents of power stage 22 as indicated in FIG. 2A. In general, controller 24 compares the measured output voltage and measured output current to the target output voltage and target output current in order to generate the appropriate PWM control signals for controlling the power switches of power stage 22.

Flow diagram 25 of FIG. 2B generally depicts the feedback loop control operation of controller 24. As described, controller 24 receives sensor signals corresponding to the measured output DC voltage ($V_{OUT}$) ("Measured V" or "Measured $V_{OUT}$") and the measured output DC current ($I_{OUT}$) ("Measured I" or "Measured $I_{OUT}$") of power stage 22 (i.e., of DC/DC converter 12a). The sensor signals are received in the time domain where they are converted into the digital domain by controller 24, such as by analog-to-digital converters of controller 24. The target output DC voltage ($V_{OUT}$) ("Target V" or "Target $V_{OUT}$") of DC/DC converter 12a is known by controller 24.

The control operation of controller 24 includes a first comparator (i.e., an adder) 26 of controller 24 comparing a digital version of the measured output DC voltage with a digital version of the target output DC voltage. First comparator 26 outputs a difference ("voltage error") signal 28 indicative of a difference between the measured output DC voltage and the target output DC voltage. A first proportional-integral (PI) control module 30 of controller 24 integrates voltage error signal 28 to generate the digital target output DC current ($I_{OUT}$) ("Target I" or "Target $I_{OUT}$").

A second comparator 32 compares a digital version of the measured output DC current with the digital version of the target output DC current. Second comparator 32 outputs a difference ("current error") signal 34 indicative of a difference between the measured output DC current and the target output DC current. A second PI control module 36 of controller 24 integrates current error signal 34 to generate a digital DC current ($I_{REF}$) command.

Controller 24 sets and/or adjusts the manner in which the power switches of power stage 22 are controlled (such as by PWM control of the power switches) based on the DC current command such that the value of the output DC current of power stage 22 tends toward the value of the target output DC current.

Figure 3:
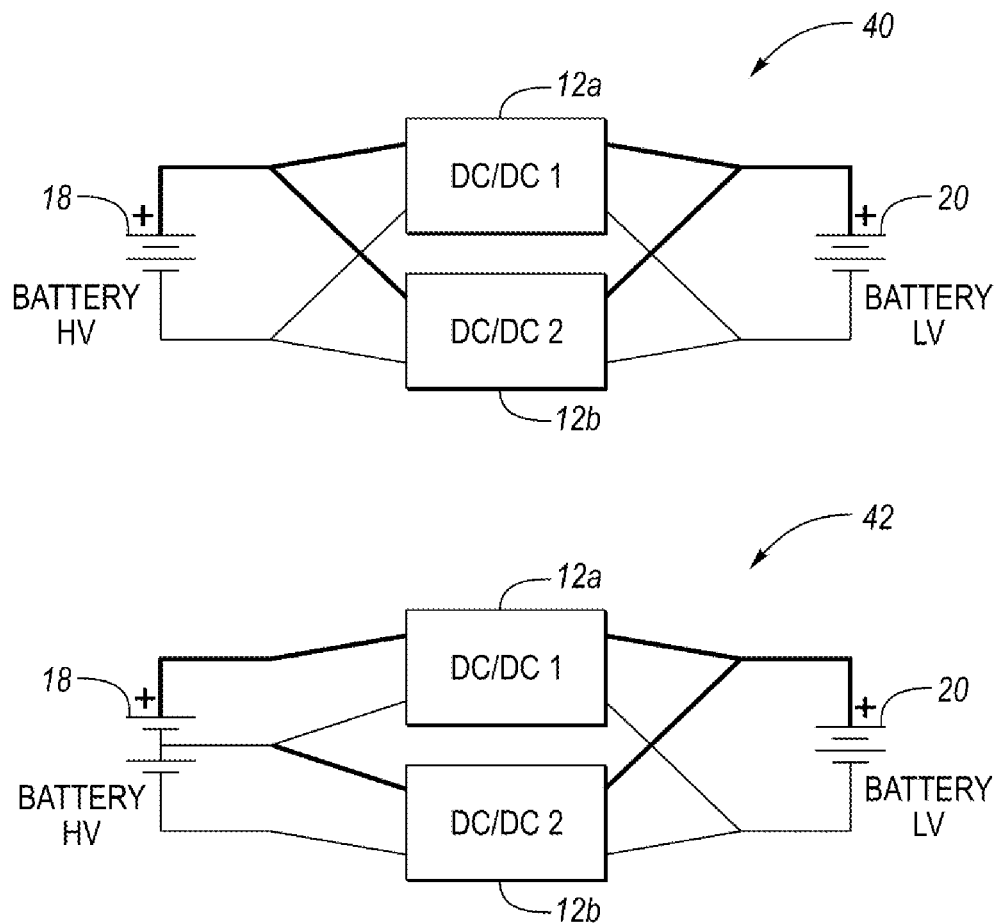
FIG. 3 illustrates two electrical schematic diagrams of alternative connection circuits of the DC/DC converter assembly connected between a HV battery of the HV network and a LV battery of the LV network for the first and second DC/DC converters to redundantly supply the LV battery with electrical energy from the HV battery.

FIG. 3 illustrates two electrical schematic diagrams 40 and 42 of alternative connection circuits of DC/DC converter assembly 10 connected between a HV battery (e.g., traction battery 18) and a LV battery (e.g., auxiliary battery 20). First DC/DC converter 12a and second DC/DC converter 12b are thus able to redundantly supply the LV battery with electrical energy of the HV battery. Output current balancing of first and second DC/DC converters 12a and 12b at the LV battery is desired to ensure stability. Basically, the two electrical schematic diagrams 40 and 42 in FIG. 3 are intended to convey that first and second converters 12a and 12b can operate with different input sources connecting to the same output.

Figure 4:
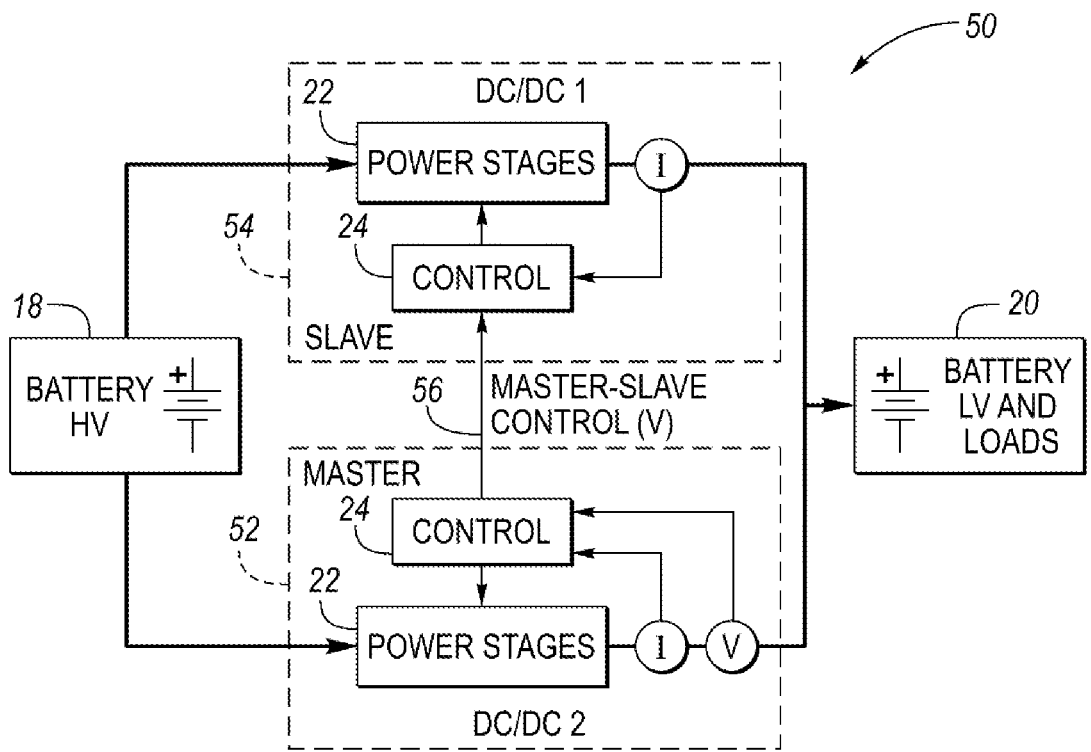
FIG. 4 illustrates a block diagram of a background DC/DC converter assembly having parallel-connected master and slave DC/DC converters, the DC/DC converters being connected in parallel between the HV battery and the LV battery.

Referring now to FIG. 4, with continual reference to FIGS. 1, 2A, and 2B, a block diagram of a background DC/DC converter assembly 50 having parallel-connected master and slave DC/DC converters is shown. Master (i.e., "first") DC/DC converter 52 and slave (i.e., "second") DC/DC converter 54 are connected in parallel between a HV battery (e.g., traction battery 18) and a LV battery (e.g., auxiliary battery 20). Power stage 22 and controller 24 of each of first DC/DC converter 52 and second DC/DC converter 54 are shown in FIG. 4.

In operation, controller 24 of first DC/DC converter 52 implements the measured output DC voltage and measured output DC current feedback control loop operation depicted in flow diagram 25 of FIG. 2B to control power stage 22 of first DC/DC converter 52 to generate an output DC voltage with an output DC current ($I_{OUT\_DC/DC\_1}$). The output DC current of first DC/DC converter 52 is to be one-half of the total output current of DC/DC converter assembly 50 (i.e., the output DC current of first DC/DC converter 52 and the output DC current of second DC/DC converter 54 are to be the same and their summation is to equal the total output DC current of background DC/DC converter assembly 50; $I_{OUT\_DC/DC\_1} = I_{OUT\_DC/DC\_2}$; and $I_{OUT\_DC/DC\_1} + I_{OUT\_DC/DC\_2} = I_{OUT\_Total}$).

With reference to flow diagram 25 of FIG. 2B, the output DC voltage of first DC/DC converter 52 will likely be at least slightly different than the target output DC voltage due to tolerances of components of first DC/DC converter 52. Further, the output DC voltage of first DC/DC converter 52 will likely be at least slightly different than the output DC voltage of second DC/DC converter 54 due to tolerances of components of second DC/DC converter 54. In sum, the output DC voltages of first and second DC/DC converters 52 and 54 will likely be different from each other and/or the target output DC voltage.

The difference in the output DC voltages has to be accounted in attempting to equalize the output DC currents of first and second DC/DC converters 52 and 54. Background DC/DC converter assembly 50 attempts to handle this task by (i) making one of the DC/DC converters function as a master (i.e., first DC/DC converter 52) and each other DC/DC converter function as a slave (i.e., second DC/DC converter 54) and (ii) arranging for controller 24 of first DC/DC converter 52 to provide a control signal indicative of the output DC current of first DC/DC converter 52 to controller 24 of second DC/DC converter 54. Controllers 24 of DC/DC converters 52 and 54 are connected via a direct connection line 56 for the controller of first DC/DC converter 52 to provide the control signal to the controller of second DC/DC converter 54.

Controller 24 of first DC/DC converter 54 implements the measured output DC current feedback control loop operation (and not the measured output DC voltage feedback control loop operation) depicted in flow diagram 25 of FIG. 2B to control power stage 22 of first DC/DC converter 52 to generate an output DC voltage with an output DC current ($I_{OUT\_DC/DC\_2}$). In implementing the measured output DC current feedback control loop operation, the value of the output DC current of first DC/DC converter 52 (provided with the control signal communicated over direct connection line 56 from the controller of first DC/DC converter 52 to the controller of second DC/DC converter 54) is used as the value of the target output DC current.

A problem is that when DC/DC converters 52 and 54 are separate modules, the synchronization control connection provided by direct connection line 56 is relatively expensive (e.g., requires fast data transfer, has low electromagnetic compatibility, has low robustness, etc.) Further, in case of malfunction of first DC/DC converter 52, second DC/DC converter 54 will take some milliseconds to start supplying electrical energy as a stand-alone. If there is no auxiliary battery 20 (i.e., LV network 16 having no battery source), then this supply interruption will not be acceptable (e.g., 12 V DC electronic control units (ECUs) of loads in LV network 16 will have too long of an electrical energy supply loss).

Figure 5:
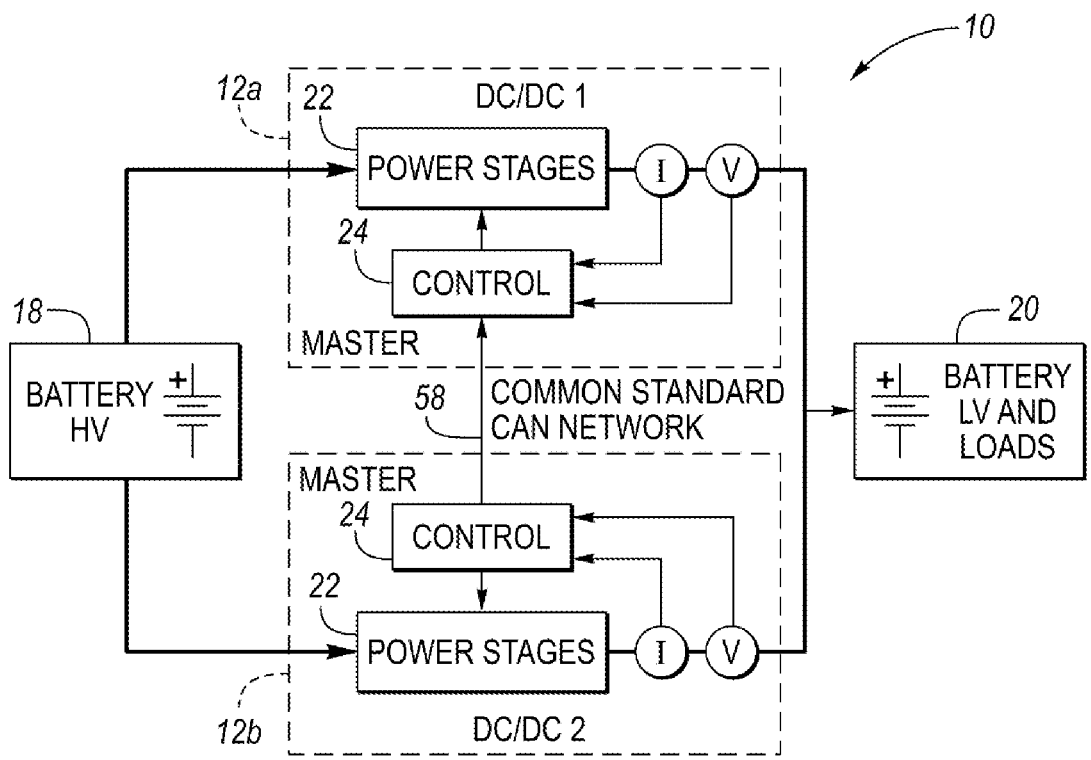
FIG. 5 illustrates another block diagram of the DC/DC converter assembly in accordance with embodiments of the present invention, the block diagram of the DC/DC converter shown in FIG. 5 being a more detailed version of the block diagram of the DC/DC converter shown in FIG. 1.

Referring now to FIG. 5, with continual reference to FIGS. 1, 2A, and 2B, another block diagram of DC/DC converter assembly 10 in accordance with embodiments of the present invention is shown. The block diagram of DC/DC converter assembly 10 in FIG. 5 is a more detailed version of the block diagram of DC/DC converter assembly 10 shown in FIG. 1.

In accordance with embodiments of the present invention, DC converter assembly 10 includes the following attributes. Controller 24 of first DC/DC converter 12a implements the measured output DC voltage and measured output DC current feedback control loop operation depicted in flow diagram 25 of FIG. 2B to control power stage 22 of first DC/DC converter 12a to generate an output DC voltage with an output DC current ($I_{OUT\_DC/DC\_1}$). Likewise, controller 24 of second DC/DC converter 12b implements the measured output DC voltage and measured output DC current feedback control loop operation depicted in flow diagram 25 of FIG. 2B to control power stage 22 of second DC/DC converter 12b to generate an output DC voltage with an output DC current ($I_{OUT\_DC/DC\_2}$).

Controller 24 of first DC/DC converter 12a and controller 24 of second DC/DC converter 12b are connected via a communications line 58 such as a Control Area Network (CAN) bus. The CAN bus is an example as communications line 58 may be embodied as another type of wired (or wireless) communications line. Each of first DC/DC converter 12a and second DC/DC converter 12b functions as a master DC/DC converter. As being master DC/DC converters, controllers 24 of first and second DC/DC converters 12a and 12b share output DC current measurements with each other through CAN bus 58. Particularly, controller 24 of first DC/DC converter 12a provides, via CAN bus 58, a control signal indicative of the output DC current ($I_{OUT\_DC/DC\_1}$) of first DC/DC converter 12a to controller 24 of second DC/DC converter 12b. Likewise, controller 24 of second DC/DC converter 12b provides, via CAN bus 58, a control signal indicative of the output DC current ($I_{OUT\_DC/DC\_2}$) of second DC/DC converter 12b to controller 24 of first DC/DC converter 12a.

In implementing the control algorithm depicted in flow diagram 25 of FIG. 2B to control power stage 22 of first DC/DC converter 12a to generate the output DC voltage with the output DC current ($I_{OUT\_DC/DC\_1}$), controller 24 of first DC/DC converter 12a determines the total output DC current ($I_{OUT\_Total}$) of DC/DC converter assembly 10. The total output DC current ($I_{OUT\_Total}$) is the summation of the output DC current ($I_{OUT\_DC/DC\_1}$) of first DC/DC converter 12a and the output DC current ($I_{OUT\_DC/DC\_2}$) of second DC/DC converter 12b (i.e., $I_{OUT\_Total} = I_{OUT\_DC/DC\_1} + I_{OUT\_DC/DC\_2}$). As described, controller 24 of first DC/DC converter 12a measures the output DC current ($I_{OUT\_DC/DC\_1}$) of first DC/DC converter 12a; and controller 24 of first DC/DC converter 12a obtains a measurement of the output DC current ($I_{OUT\_DC/DC\_2}$) of second DC/DC converter 12b from the control signal provided via CAN bus 58 from controller 24 of second DC/DC converter 12b.

In turn, controller 24 of first DC/DC converter 12a compares the output DC current ($I_{OUT\_DC/DC\_1}$) of first converter 12a with the total output DC current ($I_{OUT\_Total}$) of DC/DC converter assembly 10 (i.e., $I_{OUT\_DC/DC\_1}/I_{OUT\_Total}$) (for example, at a 50% equal ratio). The difference of the output DC current of first converter 12a with the total output DC current against the assigned percentage ratio (phrased herein as "the current ratio" of first converter 12a) is fed into the DC/DC power stage control (PWM parameter) of the control algorithm depicted in flow diagram 25 of FIG. 2B, as will be described in greater detail with reference to FIG. 6. As such, in accordance with embodiments of the present invention, an addition to the control algorithm in flow diagram 25 of FIG. 2B carried out by controller 24 of first DC/DC converter 12a includes controller 24 of first DC/DC converter 12a using a value of the total output DC current ($I_{OUT\_Total}$) of DC/DC converter assembly 10, which is determined from the sharing via CAN bus 58 of the measured output DC current ($I_{OUT\_DC/DC\_2}$) of second DC/DC converter 12b with controller 24 of first DC/DC converter 12a. As will be described in greater detail with reference to FIG. 6, controller 24 of first DC/DC converter 12a adjusts the comparison between the measured output DC voltage and the target output DC voltage as a function of the current ratio of first converter 12a.

Likewise, in implementing the control algorithm depicted in flow diagram 25 of FIG. 2B to control power stage 22 of second DC/DC converter 12b to generate the output DC voltage with the output DC current ($I_{OUT\_DC/DC\_2}$), controller 24 of second DC/DC converter 12b determines the total output DC current ($I_{OUT\_Total}$) of DC/DC converter assembly 10. As described, controller 24 of second DC/DC converter 12b measures the output DC current ($I_{OUT\_DC/DC\_2}$) of second DC/DC converter 12b; and controller 24 of second DC/DC converter 12b obtains a measurement of the output DC current ($I_{OUT\_DC/DC\_1}$) of first DC/DC converter 12a from the control signal provided via CAN bus 58 from controller 24 of first DC/DC converter 12a.

In turn, controller 24 of second DC/DC converter 12b compares the output DC current ($I_{OUT\_DC/DC\_2}$) of second converter 12b with the total output DC current ($I_{OUT\_Total}$) of DC/DC converter assembly 10 (i.e., $I_{OUT\_DC/DC\_2}/I_{OUT\_Total}$). The difference of the output DC current of second converter 12b with the total output DC current against the assigned percentage ratio (phrased herein as "the current ratio" of second converter 12b) is fed into the DC/DC power stage control (PWM parameter) of the control algorithm depicted in flow diagram 25 of FIG. 2B, as will be described in greater detail with reference to FIG. 6. As such, in accordance with embodiments of the present invention, an addition to the control algorithm in flow diagram 25 of FIG. 2B carried out by controller 24 of second DC/DC converter 12b includes controller 24 of second DC/DC converter 12b using a value of the total output DC current ($I_{OUT\_Total}$) of DC/DC converter assembly 10, which is determined from the sharing via CAN bus 58 of the measured output DC current ($I_{OUT\_DC/DC\_1}$) of first DC/DC converter 12a with controller 24 of second DC/DC converter 12b. As will be described in greater detail with reference to FIG. 6, controller 24 of second DC/DC converter 12b adjusts the comparison between the measured output DC voltage and the target output DC voltage as a function of the current ratio of second converter 12b.

Figure 6:
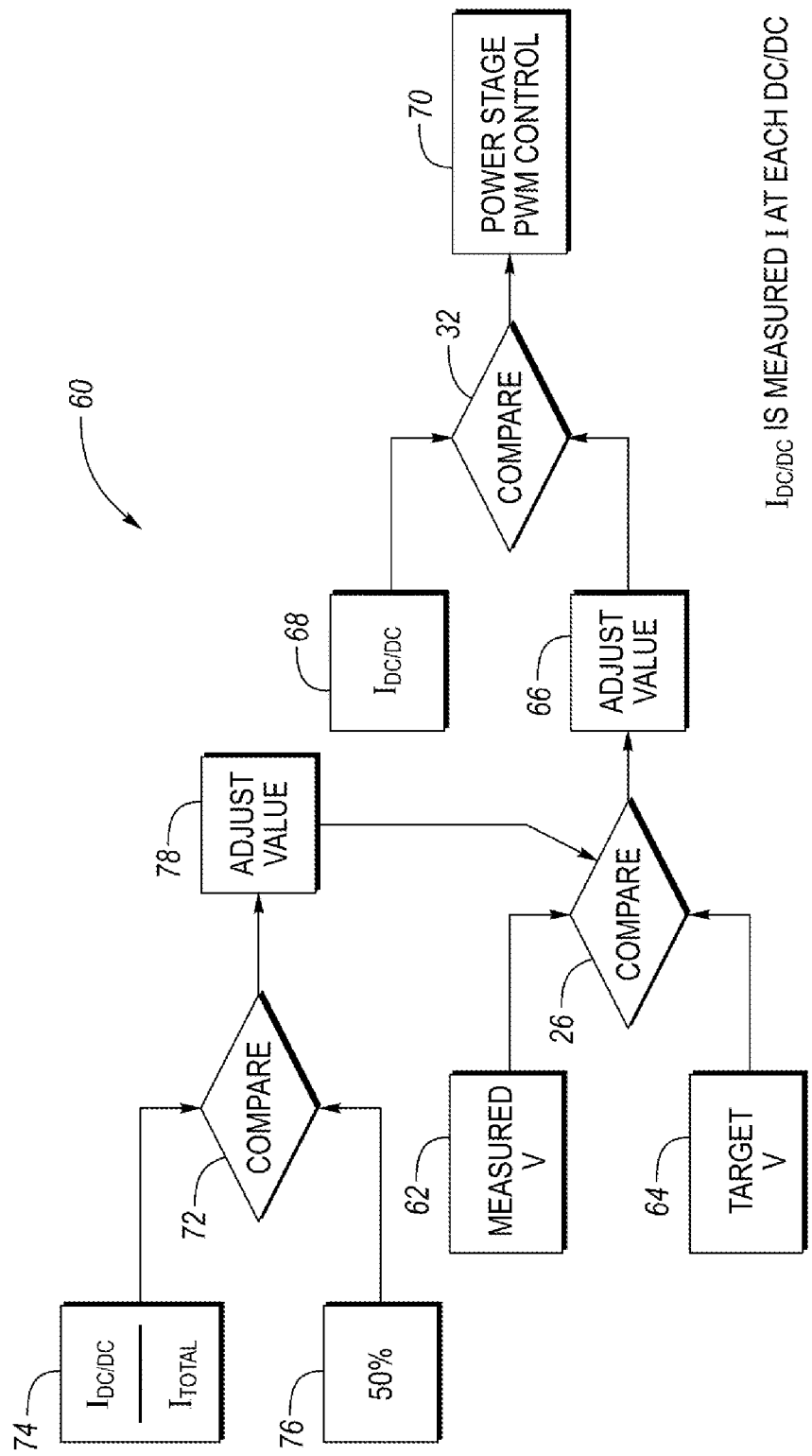
FIG. 6 illustrates a flow diagram depicting a control algorithm carried out by each of the first and second DC/DC converters of the DC/DC converter assembly in accordance with embodiments of the present invention.

Referring now to FIG. 6, with continual reference to FIGS. 2B and 5, a flow diagram 60 depicting the control algorithm carried out by each of first and second DC/DC converters 12a and 12b is shown. The control algorithm depicted in flow diagram 60 corresponds to flow diagram 25 in FIG. 2B with the addition of each DC/DC converter further using a value of the total output DC current ($I_{OUT\_Total}$) of DC/DC converter assembly 10 to determine the "current ratio" of the DC/DC converter and to then adjust (i.e., weigh) the comparison between the measured output DC voltage of the DC/DC converter and the target output DC voltage as a function of the current ratio.

In more detail, regarding first DC/DC converter 12a, first comparator 26 of controller 24 of first DC/DC converter 12a compares the measured output DC voltage of first DC/DC converter 12a, indicated with block 62, with the target output DC voltage of DC/DC converter assembly 10, indicated with block 64. Based on the voltage difference, controller 24 of first DC/DC converter 12a generates the target output DC current, indicated with block 66. As such, the target output DC current is "adjusted" from its previous value based on the voltage difference comparison. In this way, block 66 is labeled "Adjust Value". Second comparator 32 of first DC/DC converter 12a compares the measured output DC current of first DC/DC converter 12a, indicated with block 68, with the target output DC current. Based on the current difference, controller 24 of first DC/DC converter 12a determines a DC current command and sets and/or adjusts the manner in which the power switches of power stage 22 of first DC/DC converter 12a are controlled according to the DC current command such that the value of the output DC current of first DC/DC converter 12a tends toward the value of the target output DC current, as indicated with block 70.

As noted, controller 24 of first DC/DC converter 12a adjusts the comparison between the measured output DC voltage and the target output DC voltage as a function of the current ratio of first DC/DC converter 12a. In this regard, after using the value of the output DC current of second DC/DC converter 12b, obtained via CAN bus 58, to determine the total output DC current of DC converter assembly 10, a third comparator 72 of first DC/DC converter 12a compares the ratio of the output DC current of first converter 12a with the total output DC current of DC converter assembly 10, indicated in block 74, with an assigned percentage, such as 50%, indicated in block 76, to determine the "current ratio" of first DC/DC converter 12a.

Controller 24 adjusts the comparison between the measured output DC voltage and the target output DC voltage as a function of the current ratio, as indicated by block 78. In this way, the difference of the output DC current of first DC/DC converter 12a with the output DC current of second DC/DC converter 12b (assuming the assigned percentage is 50%) is fed into the control of power stage 22 of first DC/DC converter 12a as a PWM parameter to cause the value of the output DC current of first DC/DC converter 12a tend toward the value of the output DC current of second DC/DC converter 12b (i.e., tend to equalize the output DC current of first DC/DC converter 12a with the output DC current of second DC/DC converter 12b).

For instance, assume the output DC current of first DC/DC converter 12a is greater than the output DC current of second DC/DC converter 12b by a given first percentage. In this case, controller 24 adjusts the voltage difference between the measured output DC voltage and the target output DC voltage as a function of the given first percentage such that the target output DC current generated based on the voltage difference is smaller as a function of the given first percentage. Conversely, assume the output DC current of first DC/DC converter 12a is less than the output DC current of second DC/DC converter 12b by a given second percentage. In this case, controller 24 adjusts the voltage difference between the measured output DC voltage and the target output DC voltage as a function of the given second percentage such that the target output DC current generated based on the voltage difference is larger as a function of the given second percentage.

Likewise, second DC/DC converter 12b performs the control algorithm of flow diagram 60 depicted in FIG. 6. As such, the difference of the output DC current of second DC/DC converter 12b with the output DC current of first DC/DC converter 12a (assuming the assigned percentage is 50%) is fed into the control of power stage 22 of second DC/DC converter 12b as a PWM parameter to cause the value of the output DC current of second DC/DC converter 12b tend toward the value of the output DC current of first DC/DC converter 12a (i.e., tend to equalize the output DC current of second DC/DC converter 12b with the output DC current of first DC/DC converter 12a).

As described, a method and system for balancing parallel DC/DC converters in accordance with embodiments of the present invention provides an algorithm to share data between two (or more) independent DC/DC converters through a CAN bus and enable the interconnection of the outputs of the DC/DC converter. Pursuant to the algorithm, each DC/DC converter receives the value of the output DC current of the other DC/DC converter through a CAN bus and uses this value in the output DC voltage comparison to adjust the PWM control of the power switches of the DC/DC converter. The method and system solve, with optimized costs, problems associated with parallel DC/DC converter synchronization when these DC/DC converters are in separate units. The method and system find use in electrification DC/DC converters that require redundancy (e.g., two DC/DC converters working in parallel) such as because of high automotive safety integrity level (ASIL) of the supplied functions.

The method and system for balancing parallel DC/DC converters in accordance with embodiments of the present invention may include assuring system stability (differences due to tolerances, connection path, etc.); no supply interruption in case of one of a DC/DC converter malfunction; equal reaction in case of operation direction change (HV→LV to LV→HV in the connection circuit shown in electrical schematic diagram 40 of FIG. 3; no high-speed data share through already existing digital bus (CAN) so no extra cost; and in case of 800 V DC batteries with each DC/DC converter connected to one 400 V half (the connection circuit shown in electrical schematic diagram 42 of FIG. 3), the percentage ratio of supplied current may be adjusted (different from 50%) depending on HV-battery halves charge and health status.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A DC/DC converter assembly, comprising:
a plurality of DC/DC converters connected in parallel, each DC/DC converter of the plurality of DC/DC converters having a controller of a plurality of controllers, the plurality of controllers of the plurality of DC/DC converters being in communication with one another via a communications line;
wherein the controller of each DC/DC converter of the plurality of DC/DC converters is configured to transmit to the controller of other DC/DC converters of the plurality of DC/DC converters via the communications line a value of an output current of each DC/DC converter of the plurality of DC/DC converters; and
the controller of each DC/DC converter is configured to control the other DC/DC converter to cause the output current of the other DC/DC converter to tend toward a desired proportion of the output current of the other DC/DC converter to a total output current of all of the plurality DC/DC converters.

2. The DC/DC converter assembly of claim 1, wherein:
the desired proportion of the output current of the other DC/DC converter to the total output current is such that each DC/DC converter is to provide equal output currents.

3. The DC/DC converter assembly of claim 1, wherein:
the desired proportion of the output current of the other DC/DC converter to the total output current is such that one of the plurality of DC/DC converters is to provide a greatest output current and another one of the plurality of DC/DC converters is to provide a littlest output current.

4. The DC/DC converter assembly of claim 1, wherein:
the communications line is a Control Area Network (CAN) bus.

5. A DC/DC converter assembly, comprising:
a first DC/DC converter having a first controller;
a second DC/DC converter connected in parallel with the first DC/DC converter and having a second controller in communication with the first controller via a communications line,
wherein the first controller is configured to:
transmit to the second controller via the communications line a value of an output current of the first DC/DC converter and the second controller is configured to transmit to the first controller via the communications line a value of the output current of the second DC/DC converter, and
control the first DC/DC converter to cause the value of the output current of the first DC/DC converter to tend toward the value of the output current of the second DC/DC converter and the second controller is configured to control the second DC/DC converter to cause the value of the output current of the second DC/DC converter to tend toward the value of the output current of the first DC/DC converter.

6. The DC/DC converter assembly of claim 5, further comprising:
a third DC/DC converter connected in parallel with the first DC/DC converter and the second DC/DC converter and having a third controller in communication with the first controller and the second controller via the communications line;
wherein the third controller is configured to transmit to the first controller and the second controller via the communications line a value of an output current of the third DC/DC converter and the first controller and the second controller are respectively configured to transmit to the third controller via the communications line the values of the output currents of the first DC/DC converter and the second DC/DC converter; and
the first controller is further configured to control the first DC/DC converter to cause the value of the output current of the first DC/DC converter to tend toward the value of the output current of the third DC/DC converter, the second controller is configured to control the second DC/DC converter to cause the value of the output current of the second DC/DC converter to tend toward the value of the output current of the third DC/DC converter, and the third controller is configured to control the third DC/DC converter to cause the value of the output current of the third DC/DC converter to tend toward the values of the output currents of the first DC/DC converter and the second DC/DC converter.

7. The DC/DC converter assembly of claim 5, wherein
the first controller controls the first DC/DC converter as a function of a ratio of the value of the output current of the first DC/DC converter to a value of a total output current of the DC/DC converter assembly in causing the value of the output current of the first DC/DC converter to tend toward the value of the output current of the second DC/DC converter, and wherein the total output current of the DC/DC converter assembly is a summation of the output current of the first DC/DC converter and the output current of the second DC/DC converter.

8. The DC/DC converter assembly of claim 7, wherein:
the second controller controls the second DC/DC converter as a function of a ratio of the value of the output current of the second DC/DC converter to the value of the total output current of the DC/DC converter assembly in causing the value of the output current of the second DC/DC converter to tend toward the value of the output current of the first DC/DC converter.

9. The DC/DC converter assembly of claim 5, wherein:
the first controller controls the first DC/DC converter based on a difference between an output voltage of the first DC/DC converter and a target voltage of the DC/DC converter assembly and based on a difference between the output current of the first DC/DC converter and a target output current of the first DC/DC converter for the first DC/DC converter to generate the output current of the first DC/DC converter.

10. The DC/DC converter assembly of claim 9, wherein:
the first controller weights the difference between the output voltage of the first DC/DC converter and the target voltage of the DC/DC converter assembly as a function of a ratio of the value of the output current of the first DC/DC converter to a value of a total output current of the DC/DC converter assembly, the total output current of the DC/DC converter assembly being a summation of the output current of the first DC/DC converter and the output current of the second DC/DC converter.

11. The DC/DC converter assembly of claim 10, wherein:
the first controller adjusts the target output current of the first DC/DC converter based on the weighted difference between the output voltage of the first DC/DC converter and the target voltage of the DC/DC converter assembly.

12. The DC/DC converter assembly of claim 9, wherein:
the second controller controls the second DC/DC converter based on a difference between an output voltage of the second DC/DC converter and the target voltage of the DC/DC converter assembly and based on a difference between the output current of the second DC/DC converter and a target output current of the second DC/DC converter for the second DC/DC converter to generate the output current of the second DC/DC converter.

13. The DC/DC converter assembly of claim 12, wherein:
the second controller weights the difference between the output voltage of the second DC/DC converter and the target voltage of the DC/DC converter assembly as a function of a ratio of the value of the output current of the second DC/DC converter to a value of a total output current of the DC/DC converter assembly, the total output current of the DC/DC converter assembly being a summation of the output current of the first DC/DC converter and the output current of the second DC/DC converter.

14. The DC/DC converter assembly of claim 13, wherein:
the second controller adjusts the target output current of the second DC/DC converter based on the weighted difference between the output voltage of the second DC/DC converter and the target voltage of the DC/DC converter assembly.

15. The DC/DC converter assembly of claim 5, wherein: the first DC/DC converter and the second DC/DC converter are for converting an input voltage with an input current of a traction battery of an electric vehicle into an output voltage with a total output current for charging an auxiliary battery of the electric vehicle, the total output current being a summation of the output current of the first DC/DC converter and the output current of the second DC/DC converter.

16. A method for balancing output currents of parallel connected a first DC/DC converter and a second DC/DC converter of a DC/DC converter assembly, the method comprising:
transmitting from a first controller of the first DC/DC converter to a second controller of the second DC/DC converter, via a communications line connected between the first controller and the second controller, a value of an output current of the first DC/DC converter;
transmitting from the second controller to the first controller, via the communications line, a value of an output current of the second DC/DC converter;
controlling, by the first controller, the first DC/DC converter to cause the value of the output current of the first DC/DC converter to tend toward the value of the output current of the second DC/DC converter; and
controlling, by the second controller, the second DC/DC converter to cause the value of the output current of the second DC/DC converter to tend toward the value of the output current of the first DC/DC converter.

17. The method of claim 16, further comprising:
controlling, by the first controller, the first DC/DC converter as a function of a ratio of the value of the output current of the first DC/DC converter to a value of a total output current of the DC/DC converter assembly in causing the value of the output current of the first DC/DC converter to tend toward the value of the output current of the second DC/DC converter, wherein the total output current of the DC/DC converter assembly is a summation of the output current of the first DC/DC converter and the output current of the second DC/DC converter.

18. The method of claim 17, further comprising:
controlling, by the second controller, the second DC/DC converter as a function of a ratio of the value of the output current of the second DC/DC converter to the value of the total output current of the DC/DC converter assembly in causing the value of the output current of the second DC/DC converter to tend toward the value of the output current of the first DC/DC converter.

19. The method of claim 16, further comprising:
controlling, by the first controller, the first DC/DC converter based on a difference between an output voltage of the first DC/DC converter and a target voltage of the DC/DC converter assembly and based on a difference between the output current of the first DC/DC converter and a target output current of the first DC/DC converter for the first DC/DC converter to generate the output current of the first DC/DC converter.

20. The method of claim 19, further comprising:
weighting, by the first controller, the difference between the output voltage of the first DC/DC converter and the target voltage of the DC/DC converter assembly as a function of a ratio of the value of the output current of the first DC/DC converter to a value of a total output current of the DC/DC converter assembly, the total output current of the DC/DC converter assembly being a summation of the output current of the first DC/DC converter and the output current of the second DC/DC converter; and
adjusting, by the first controller, the target output current of the first DC/DC converter based on the weighted difference between the output voltage of the first DC/DC converter and the target voltage of the DC/DC converter assembly.

* * * * *